US009260566B2

(12) United States Patent
Takemura et al.

(10) Patent No.: US 9,260,566 B2
(45) Date of Patent: Feb. 16, 2016

(54) COMPOSITION FOR OPTICAL MATERIALS, PROCESS FOR PRODUCTION THEREOF, AND OPTICAL MATERIALS MADE FROM THE COMPOSITION

(71) Applicant: MITSUBISHI GAS CHEMICAL COMPANY, INC., Tokyo (JP)

(72) Inventors: Kouhei Takemura, Osaka (JP); Hiroshi Horikoshi, Osaka (JP)

(73) Assignee: MITSUBISHI GAS CHEMICAL, INC., Tokyo (JP)

( * ) Notice: Subject to any disclaimer, the term of this patent is extended or adjusted under 35 U.S.C. 154(b) by 0 days.

(21) Appl. No.: 14/672,922

(22) Filed: Mar. 30, 2015

(65) Prior Publication Data
US 2015/0203633 A1    Jul. 23, 2015

Related U.S. Application Data

(62) Division of application No. 13/577,288, filed as application No. PCT/JP2011/053650 on Feb. 21, 2011.

(30) Foreign Application Priority Data

Feb. 25, 2010 (JP) ................. 2010-040420

(51) Int. Cl.
C08G 75/20 (2006.01)
C08G 75/04 (2006.01)
C08G 75/08 (2006.01)
C08L 81/02 (2006.01)
G02B 1/04 (2006.01)

(52) U.S. Cl.
CPC .............. *C08G 75/04* (2013.01); *C08G 75/08* (2013.01); *C08L 81/02* (2013.01); *G02B 1/041* (2013.01)

(58) Field of Classification Search
CPC .......... C08G 75/08; G02B 1/04; C08L 81/00; B29B 13/00; B30B 9/28
USPC ........................................ 528/375
See application file for complete search history.

(56) References Cited

U.S. PATENT DOCUMENTS

| 5,807,975 A | 9/1998 | Amagai et al. |
| 6,117,923 A | 9/2000 | Amagai et al. |
| 6,531,532 B1 | 3/2003 | Yoshimura et al. |
| 2004/0254258 A1 | 12/2004 | Horikoshi et al. |
| 2009/0018308 A1* | 1/2009 | Kamura et al. ............... 528/375 |
| 2009/0019308 A1 | 1/2009 | Amano |
| 2009/0264613 A1 | 10/2009 | Kuma et al. |
| 2010/0004421 A1 | 1/2010 | Horikoshi et al. |
| 2010/0010192 A1* | 1/2010 | Kawaguchi et al. .......... 528/374 |
| 2010/0130661 A1 | 5/2010 | Takeuchi et al. |
| 2010/0331515 A1 | 12/2010 | Takeuchi et al. |
| 2012/0142889 A1 | 6/2012 | Aoki et al. |

FOREIGN PATENT DOCUMENTS

| JP | 60166863 | * 8/1985 | ............ G01N 33/02 |
| JP | 9-110979 | 4/1997 | |
| JP | 10-298287 | 11/1998 | |
| JP | 2001-002783 | 1/2001 | |
| JP | 2004-137481 | 5/2004 | |
| JP | 2004-256566 | 9/2004 | |
| JP | 2004-345123 | 12/2004 | |
| JP | 2007-197615 | 8/2007 | |
| JP | 2007-284406 | 11/2007 | |
| JP | 2007-321072 | 12/2007 | |
| JP | 2009-74033 | 4/2009 | |
| JP | 2009-108293 | 5/2009 | |
| WO | 2008/035643 | 3/2004 | |
| WO | 2007/129450 | 11/2007 | |
| WO | 2011/007749 | 1/2011 | |

OTHER PUBLICATIONS

Search report from International Application No. PCT/JP/053650, mail date is May 24, 2011.
Extended European Search Report in respect to European Application No. 11747281.1, dated Oct. 16, 2015.
Mike Sadar, "Turbidmeter Instrument Comparison: Low-Level Sample Measurement", 1999, HACH Company, Loveland, Colorada, USA, pp. 1-56, XP002745405.
Ravi Jethra, "Turbidity Measurement", ISA Transactions, Instrument Society of America, Pittsburg, US, vol. 32, No. 4, Dec. 1, 1993, pp. 397-405, XP000426359.

* cited by examiner

*Primary Examiner* — Shane Fang
(74) *Attorney, Agent, or Firm* — Greenblum & Bernstein, P.L.C.

(57) ABSTRACT

The present invention has an object of providing, for example, a composition for optical materials which contains a polythiol that can be predicted and assessed, in a stage prior to polymerization/curing, as being clouded or not clouded after polymerization/curing, and thus can be determined as being good or defective. According to the present invention, the above-described object is achieved by, for example, a composition for optical materials which comprises a polythiol that exhibits an initial turbidity of 0.5 ppm or less and a turbidity of 0.6 ppm or less after the storage at 50° C. for 7 days, and an episulfide. Namely, an optical material made from a composition for optical materials which contains a polythiol satisfying the above turbidity requirements can be prevented from clouding to exhibit excellent transparency.

5 Claims, No Drawings

COMPOSITION FOR OPTICAL MATERIALS, PROCESS FOR PRODUCTION THEREOF, AND OPTICAL MATERIALS MADE FROM THE COMPOSITION

CROSS-REFERENCE TO RELATED APPLICATIONS

The present application is a divisional application of U.S. application Ser. No. 13/577,288, which is a National Stage of PCT/JP2011/053650, filed Feb. 21, 2011. The disclosures of application Ser. No. 13/577,288 and PCT/JP2011/053650 are incorporated by reference herein in their entireties. The present application also claims priority of Japanese application 2010-040420, filed Feb. 25, 2010.

TECHNICAL FIELD

The present invention relates to, for example, a composition for an optical material, and specifically to, for example, a composition for an optical material which is preferable for an optical material such as a plastic lens, a prism, an optical fiber, an information recording substrate, a filter or the like, especially a plastic lens.

BACKGROUND ART

Plastic materials are lightweight, highly tough and easy to be dyed, and therefore are widely used recently for various types of optical materials, especially eyeglass lenses. Optical materials, especially eyeglass lenses, are specifically required to have, as physical properties, low specific gravity, high transparency and low yellow index, high heat resistance, high strength and the like, and as optical properties, high refractive index and high Abbe number. A high refractive index allows a lens to be thinner, and a high Abbe number reduces the chromatic aberration of a lens. However, as the refractive index is increased, the Abbe number is decreased. Thus, it has been studied to improve both of the refractive index and the Abbe number. Among methods which have been proposed, a representative method uses an episulfide compound as described in Patent Document 1.

Meanwhile, in order to improve the oxidation resistance, Patent Document 2 proposes adding a thiol compound to an episulfide compound.

It has also been studied to improve the refractive index. Patent Documents 3 and 4 propose a composition containing sulfur, episulfide and thiol.

However, these composition containing thiol have a problem of being clouded when being polymerized and thus cured. These composition are to be used for optical materials. Therefore, if the composition are clouded after being cured, the composition become all defective. This causes a massive loss. Accordingly, a technique for estimating, on a pre-curing stage, whether the composition will be clouded or not after being cured, so that the composition is determined as being good or not has been desired.

CITATION LIST

Patent Literature

Patent Document 1: Japanese Laid-Open Patent Publication No. H9-110979
Patent Document 2: Japanese Laid-Open Patent Publication No. H10-298287
Patent Document 3: Japanese Laid-Open Patent Publication No. 2001-2783
Patent Document 4: Japanese Laid-Open Patent Publication No. 2004-137481

SUMMARY OF INVENTION

Technical Problem

A problem to be solved by the present invention is to provide a composition for an optical material comprising polythiol which can be estimated, on a pre-polymerization/curing stage, as being clouded or not clouded after being cured, and thus can be determined as being good or defective.

Solution to Problem

As a result of accumulating active studies in light of such circumstances, the present inventors solved the problem by, for example, a composition for an optical material comprising polythiol having an initial turbidity of 0.5 ppm or less and a turbidity of 0.6 ppm or less after being stored at 50° C. for 7 days, and episulfide; and thus achieved the present invention.

Namely, the present invention is as follows.

<1> A composition for an optical material comprising polythiol having an initial turbidity of 0.5 ppm or less and a turbidity of 0.6 ppm or less after being stored at 50° C. for 7 days, and episulfide.

<2> The composition for an optical material according to <1> above, further comprising sulfur.

<3> The composition for an optical material according to <2> above, wherein the episulfide and the sulfur are preliminarily polymerized.

<4> The composition for an optical material according to <2> above, wherein 10% or more of the sulfur is preliminarily polymerized with the episulfide.

<5> The composition for an optical material according to any one of <1> through <4> above, which is obtained as a result of degassing.

<6> An optical material obtained by polymerizing the composition for an optical material according to any one of <1> through <5> above.

<7> The optical material according to <6> above, which is obtained as a result of annealing the post-polymerization composition for an optical material.

<8> A method for producing a composition for an optical material, comprising the step of mixing polythiol having an initial turbidity of 0.5 ppm or less and a turbidity of 0.6 ppm or less after being stored at 50° C. for 7 days, and episulfide.

<9> The method for producing a composition for an optical material according to <8> above, further comprising the step of incorporating sulfur.

<10> The method for producing a composition for an optical material according to <8> or <9> above, further comprising the step of degassing.

Advantageous Effects of Invention

According to the present invention, it has now become possible to provide, for example, a composition for an optical material containing polythiol which can be estimated, on a pre-polymerization/curing stage, as being clouded or not clouded after being polymerized and thus cured, and so can be determined as being good or defective. Provision of such a composition has been difficult with the conventional art.

DESCRIPTION OF EMBODIMENTS

According to the present invention, any of all polythiol compounds is usable. Specific examples thereof include methanedithiol, 1,2-dimercaptoethane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl 1,4-dimercaptopropane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, ethyleneglycolbis(2-mercaptoacetate), ethyleneglycolbis(3-mercaptopropionate), 1,4-butanediolbis(2-mercaptoacetate), 1,4-butanediolbis(3-mercaptopropionate), trimethylolpropanetris(2-mercaptoacetate), trimethylolpropanetris(3-mercaptopropionate), pentaerythritoltetrakis(2-mercaptoacetate), pentaerythritoltetrakis(3-mercaptopropionate), 1,1-dimercaptocyclohexane, 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(mercaptoethyl)-1,4-dithiane, 1,2-bis(mercaptomethyl)benzene, 1,3-bis(mercaptomethyl)benzene, 1,4-bis(mercaptomethyl)benzene, bis(4-mercaptophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether, 2,2-bis(4-mercaptomethylphenyl)propane, and the like.

Specific examples of preferable compounds among the above-listed compounds include bis(2-mercaptoethyl)sulfide, pentaerythritoltetrakis(2-mercaptoacetate), pentaerythritoltetrakis(3-mercaptopropionate), 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, 1,3-bis(mercaptomethyl)benzene, and 1,4-bis(mercaptomethyl)benzene. Specific examples of more preferable compounds include bis(2-mercaptoethyl)sulfide and 1,3-bis(mercaptomethyl)benzene. Bis(2-mercaptoethyl)sulfide is most preferable.

According to the present invention, the turbidity is measured by an integrating sphere type turbidimeter on the basis of the kaolin standard solution in conformity to JIS K0101. The acceleration is measured after polythiol is stored at 50° C. for 7 days.

After these measurements, polythiol having an initial turbidity of 0.5 ppm or less and a turbidity of 0.6 ppm or less after being stored at 50° C. for 7 days is used. Preferably, the initial turbidity, namely, the turbidity immediately before storage at 50° C. for 7 days is 0.3 ppm or less, and the turbidity after storage at 50° C. for 7 days is 0.4 ppm or less. More preferably, the initial turbidity is 0.2 ppm or less, and the turbidity after storage at 50° C. for 7 days is 0.3 ppm or less.

When the initial turbidity exceeds 0.5 ppm or the turbidity after storage at 50° C. for 7 days exceeds 0.6 ppm, an optical material such as a post-polymerization/curing lens is clouded and is not usable. Accordingly, by measuring the initial turbidity and the turbidity after storage at 50° C. for 7 days of polythiol, the estimation on whether the polythiol will be clouded or not can be made in the state where the polythiol has not been polymerized/cured. Thus, the quality of the polythiol can be determined.

The actual operation is conducted as follows. First, the initial turbidity of polythiol is measured. A part of the polythiol is taken out and stored at 50° C. for 7 days, and then the turbidity thereof is measured. In the case where both of the values are in the above-described ranges, an optical material formed of the polythiol will not be clouded. Thus, this polythiol is determined as being usable.

Where the sum of polythiol and episulfide is 100 parts by weight, a polythiol compound used in the present invention is usually contained in an amount of 1 to 30 parts by weight, preferably 2 to 20 parts by weight, and especially preferably 3 to 15 parts by weight.

According to the present invention, any of all episulfide compounds is usable. Specific examples thereof will be listed below regarding each type of compounds, i.e., compounds having a chain aliphatic structure, compounds having an aliphatic cyclic structure, and compounds having an aromatic structure.

The compounds having a chain aliphatic structure include compounds expressed by the following formula (1):

[Chemical formula 1]

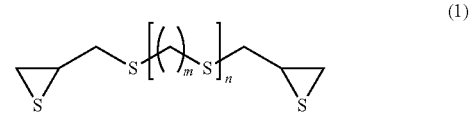

(1)

(where m represents an integer of 0 to 4, and n represents an integer of 0 or 1).

The compounds having an aliphatic cyclic structure include compounds expressed by the following formula (2) or (3):

[Chemical formula 2]

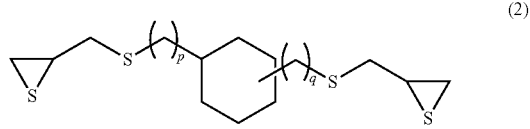

(2)

(where p and q each represent an integer of 0 to 4).

[Chemical formula 3]

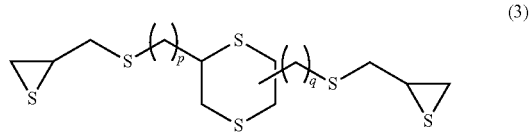

(3)

(where p and q each represent an integer of 0 to 4).

The compounds having an aromatic structure include compounds expressed by the following formula (4):

[Chemical formula 4]

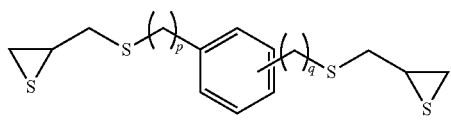

(4)

(where p and q each represent an integer of 0 to 4).

Among the above-shown compounds, the compounds expressed by formula (1) above having a chain aliphatic structure are preferable. Specific examples thereof include bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,4-bis(β-epithiopropylthio)butane, and bis(β-epithiopropylthioethyl)sulfide. Bis(β-epithiopropyl)sulfide (in formula (1) above, n=0) and bis(β-epithiopropyl)disulfide (in formula (1) above, m=0, n=1) are especially preferable. Bis(β-epithiopropyl)sulfide (in formula (1) above, n=0) is most preferable.

Examples of the episulfide compounds having an aliphatic cyclic structure include 1,3- and 1,4-bis(β-epithiopropylthio)cyclohexane (in formula (2) above, p=0, q=0), 1,3- and 1,4-(β-epithiopropylthiomethyl)cyclohexane (in formula (2) above, p=1, q=1), bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthio)-1,4-dithiane (in formula (3) above, p=0, q=0), 2,5-bis(β-epithiopropylthioethylthiomethyl)-1,4-dithiane, and the like.

Examples of the episulfide compounds having an aromatic structure include 1,3- and 1,4-bis(β-epithiopropylthio)benzene (in formula (4) above, p=0, q=0), 1,3- and 1,4-bis(β-epithiopropylthiomethyl)benzene (in formula (4) above, p=1, q=1), bis[4-(β-epithiopropylthio)phenyl)]methane, 2,2-bis[4-(β-epithiopropylthio)phenyl]propane, bis[4-(β-epithiopropylthio)phenyl)]sulfide, bis[4-(β-epithiopropylthio)phenyl)]sulfine, 4,4-bis(β-epithiopropylthio)biphenyl, and the like.

Where the sum of polythiol and episulfide is 100 parts by weight, an episulfide compound used in the present invention is usually contained in an amount of 70 to 90 parts by weight, preferably 80 to 98 parts by weight, and especially preferably 85 to 97 parts by weight.

A composition for an optical material according to the present invention may further contain sulfur. When sulfur is used, it is preferable to react an episulfide compound with sulfur preliminarily. Such a preliminary polymerization reaction is performed, preferably under the conditions of at −10° C. to 120° C. for 0.1 to 240 hours, more preferably under the conditions of at 0° C. to 100° C. for 0.1 to 120 hours, and especially preferably under the conditions of at 20° C. to 80° C. for 0.1 to 60 hours. In order to promote the preliminary reaction, it is effective to use a catalyst. Preferable examples of the catalyst include 2-mercapto-1-methylimidazole, triphenylphosphine, 3,5-dimethylpyrazole, N-cyclohexyl-2-benzothiazolylsulfineamide, dipentamethylenethiuramtetrasulfide, tetrabutylthiuramdisulfide, tetraethylthiuramdisulfide, 1,2,3-triphenylguanidine, 1,3-diphenylguanidine, 1,1,3,3-tetramethyleneguanidine, aminoguanidineurea, trimethylthiourea, tetraethylthiourea, dimethylethylthiourea, zinc dibutyldithiocarbamate, zinc dibentyldithiocarbamate, zinc diethyldithiocarbamate, zinc dimethyldithiocarbamate, pipecorium pipecoryldithiocarbamate, and the like. In addition, it is preferable to consume 10% or more of sulfur by this preliminary polymerization reaction (where the amount of sulfur before the reaction is 100%), and it is more preferable to consume 20% or more of sulfur. The preliminary reaction may be performed in an optional atmosphere, for example, under inert gas such as air, nitrogen or the like, in a sealed state at normal pressure or at a raised or reduced pressure, or the like. In order to detect how much the preliminary reaction has proceeded, a liquid chromatograph or a refractive index meter can be used.

Where the sum of polythiol and episulfide is 100 parts by weight, sulfur, which is used in a preferable embodiment of the present invention, is usually contained in an amount of 0.1 to 40 parts by weight, preferably 0.5 to 30 parts by weight, and especially preferably 5 to 25 parts by weight.

According to the present invention, it is preferable to perform degassing (deaeration) of the composition for an optical material in advance. The degassing is performed under a reduced pressure before, during or after the mixture of a compound reactive with a part of, or all of, the components of the composition, a polymerization catalyst, and an additive. Preferably, the degassing is performed at a reduced pressure during or after the mixing. Preferably, the degassing is performed under the conditions of at a reduced pressure of 0.001 to 50 torr for 1 minute to 24 hours at 0° C. to 100° C. The degree of pressure reduction is preferably 0.005 to 25 torr, and more preferably 0.01 to 10 torr. The degree of pressure reduction may be varied within such a range. The degassing time is preferably 5 minutes to 18 hours, and more preferably 10 minutes to 12 hours. The temperature for the degassing is preferably 5° C. to 80° C., and more preferably 10° C. to 60° C. The temperature may be varied within such a range. When performing the aeration, updating the interface of the composition for a resin by stirring, blowing-in of gas, vibration by ultrasonic waves or the like is preferable in order to improve the effect of the degassing. A component which is removed by the degassing is mainly, for example, dissolved gas such as hydrogen sulfide or the like or a low boiling point substance such as thiol or the like. There is no specific limitation on the type of target of removal as long as the effect of the present invention is provided.

In addition, filtrating out impurities from the composition for an optical material or pre-mixing materials of the composition by use of a filter having a pore diameter of about 0.05 to 10 μm for the purpose of refinement is preferable in order to improve the quality of the optical material according to the present invention.

Hereinafter, a method for producing an optical material by polymerizing a composition for an optical material according to the present invention will be described.

Examples of a catalyst usable for polymerizing and thus curing the composition for an optical material include amine, onium salts, and phosphine compounds. Specific examples thereof include amine, quaternary ammonium salts, quaternary phosphonium salts, tertiary sulfonium salts, secondary iodonium salts, and phosphine compounds. Among these, quaternary ammonium salts, quaternary phosphonium salts and phosphine compounds are highly compatible with the composition and are preferable. Quaternary phosphonium salts are more preferable. Specific examples of the preferable compounds include quaternary ammonium salts such as tetra-n-butylammoniumbromide, tetraphenylammoniumbromide, triethylbenzylammoniumchloride, cetyldimethylbenzylammoniumchloride, 1-n-dodecylpyridiniumchloride, and the like; quaternary phosphonium salts such as tetra-n-butylphosphoniumbromide, tetraphenylphosphoniumbromide, and the like; and phosphine compounds such as triphenylphosphine and the like. Among these compounds, triethylbenzylammoniumchloride and tetra-n-butylphosphoniumbromide are more preferable, and tetra-n-butylphosphoniumbromide is most preferable. The polymerization catalysts may be used independently or in a mixture of two or more.

The amount of the polymerization catalyst varies in accordance with the components, mixing ratio and polymerization/curing method of the composition and thus cannot be unconditionally determined. The amount of the polymerization catalyst is usually 0.001 wt. % or greater and 5 wt. % or less, preferably 0.01 wt. % or greater and 1 wt. % or less, and most preferably 0.01 wt. % or greater and 0.5 wt. % or less, with respect to the total amount of the composition for an optical material. When the amount of the polymerization catalyst is greater than 5 wt. %, the refractive index and the heat resistance of the cured product may be lowered and thus the cured product may be colored. When the amount of the polymerization catalyst is less than 0.001 wt. %, the composition may not be sufficiently cured and the heat resistance of the resultant product may be insufficient.

For polymerizing and thus curing the composition for an optical material, a polymerization adjusting agent may be optionally added for the purpose of extending the pot life or dispersing the polymerization heat. As the polymerization adjusting agent, any of the group 13 through 16 halides in the long form periodic table is usable. Among these compounds, preferable compounds include halides of silicon, germanium, tin and antimony. More preferable compounds include chlorides of germanium, tin and antimony having an alkyl group. Specific examples of the more preferable compounds include dibutyltindichloride, butyltintrichloride, dioctyltindichloride, octyltintrichloride, dibutyldichlorogermanium, butyltrichlorogermanium, diphenyldichlorogennanium, phenyltrichlorogermanium, and triphenylantimonydichloride. A specific example of most preferable compounds is dibutyltinchloride. The polymerization adjusting agents may be used independently or in a mixture of two or more.

The amount of the polymerization adjusting agent is usually 0.0001 wt. % to 5.0 wt. %, preferably 0.0005 wt. % to 3.0 wt. % or less, and most preferably 0.001 wt. % to 2.0 wt. % or less, with respect to the total amount of the composition for an optical material.

For polymerizing and thus curing the composition for an optical material according to the present invention and thus for obtaining an optical material, any of additives such as a known antioxidant, ultraviolet absorber, blueing agent and the like can be added to improve the practicality of the material to be obtained.

Preferable examples of the antioxidant include phenol derivatives. Among these, preferable compounds include polyhydric phenols and halogen-substituted phenols. More preferable compounds include catechols, pyrogallols, alkyl-substituted catechols. Most preferable compounds include catechols and pyrogallols. Preferable examples of the ultraviolet absorber include benzotriazole-based compounds. Specific examples of the preferable compounds among these compounds include 2-(2-hydroxy-5-methylphenyl)-2H-benzotriazole, 5-chloro-2-(3,5-di-tert-butyl-2-hydroxyphenyl)-2H-benzotriazole, 2-(3-tert-butyl-2-hydroxy-5-methylphenyl)-5-chloro-2H-benzotriazole, 2-(3,5-di-tert-pentyl-2-hydroxyphenyl)-2H-benzotriazole, 2-(3,5-di-tert-butyl-2-hydroxyphenyl)-2H-benzotriazole, 2-(2-hydroxy-4-octyloxyphenyl)-2H-benzotriazole, and 2-(2-hydroxy-5-tert-octylphenyl)-2H-benzotriazole. Preferable examples of the blueing agent include anthraquinone-based compounds.

In the case where the composition for an optical material according to the present invention is easily delaminated from the mold during the polymerization, a known external and/or internal adhesiveness improving agent can be used to control and improve the adhesiveness of the cured product to be obtained to the mold. Examples of the adhesiveness improving agent include known silane coupling agents, titanate compounds and the like. These adhesiveness improving agents may be used independently or in a mixture of two or more. The amount of the adhesiveness improving agent is usually 0.0001 wt. % to 5 wt. % with respect to the total amount of the composition for an optical material. By contrast, in the case where the composition for an optical material according to the present invention is difficult to be delaminated from the mold after the polymerization, a known external and/or internal releasing agent can be used to improve the releasability, from the mold, of the cured product to be obtained. Examples of the releasing agent include fluorine-based nonion surfactants, silicon-based nonion surfactants, ester phosphate, acid ester phosphate, oxyalkylene-type acid ester phosphate, alkali metal salts of acid ester phosphate, alkali metal salts of oxyalkylene-type acid ester phosphate, metal salts of higher fatty acid, higher fatty acid ester, paraffin, wax, higher aliphatic amide, higher aliphatic alcohol, polysyloxanes, aliphatic amineethyleneoxide adducts, and the like. These releasing agents may be used independently or in a mixture of two or more. The amount of the releasing agent is usually 0.0001 wt. % to 5 wt. % with respect to the total amount of the composition for an optical material.

A method for producing an optical material by polymerizing and thus curing a composition for an optical material according to the present invention is, in more detail, as follows. The components of the composition, and additives such as the antioxidant, ultraviolet absorber, polymerization catalyst, radical polymerization initiator, adhesiveness improving agent, releasing agent and the like described above may be all mixed together in the same vessel while being stirred; the components and additives may be added step by step and mixed; or different groups of the components and additives may be mixed separately and then the groups may be added together in the same vessel. The components and sub components may be mixed in any order. There is basically no specific limitation on the set temperature, the time and the like for mixing as long as the components and additives are sufficiently mixed.

The composition for an optical material obtained as a result of the above-described reaction and processing is injected into a glass or metal mold, and is heated or irradiated with active energy rays such as ultraviolet rays or the like, so that the polymerization/curing proceeds. Then, the resultant substance is removed from the mold. In this manner, the optical material is produced. For producing an optical material, the polymerization/curing of the composition for an optical material is preferably performed by heating. In this case, the curing time is 0.1 to 200 hours, usually 1 to 100 hours. The curing temperature is −10° C. to 160° C., usually −10° C. to 140° C. The polymerization can be performed by holding the polymerization temperature for a prescribed time period, increasing the temperature at a rate of 0.1° C. to 100° C./hour, decreasing the temperature at a rate of 0.1° C. to 100° C./hour, or a combination thereof. In the process for producing an optical material according to the present invention, annealing the post-polymerization/curing product at a temperature of 50° C. to 150° C. for about 10 minutes to 5 hours is preferable in order to remove distortion from the optical material. In addition, surface treatment such as dyeing, hard-coating, anti-impact-coating, reflection prevention, provision of antifogging property or the like may be performed.

EXAMPLES

Hereinafter, the present invention will be specifically described by way of examples, but the present invention is not limited to the following examples. The evaluation was performed by the following method.

Turbidity: The initial turbidity and the turbidity after storage at 50° C. for 7 days of polythiol were measured by use of T-2600DA turbidimeter produced by Tokyo Denshoku Co., Ltd.

Transparency: Ten lenses having a lens diameter of 70 mm and a degree of +5D were produced by use of optical materials produced by polymerization of compositions for an optical material. The lenses were observed in a darkroom under fluorescent light. The optical materials were evaluated as follows: the optical material used for producing the ten glasses, none of which was clouded, was rated "4"; the optical material used for producing the ten glasses, nine of which were not clouded, was rated "3"; the optical material used for producing the ten glasses, seven or eight of which were not clouded, was rated "2"; and the optical material used for producing the ten glasses, six or less of which were not clouded, was rated "1". The optical materials rated "2" or higher are acceptable.

Example 1

A composition for an optical material, and an optical material, according to the present invention were produced by use of bis(1-mercaptoethyl)sulfide having an initial turbidity of 0.15 and a turbidity of 0.15 after storage at 50° C. for 7 days in accordance with production method A described below. The transparency of the obtained optical material was good and "4". The results are shown in Table 1.

Examples 2 Through 6

A composition for an optical material, and an optical material, according to the present invention were produced by use of bis(2-mercaptoethyl)sulfide having an initial turbidity and a turbidity after storage at 50° C. for 7 shown in Table 1 in accordance with the production method shown in Table 1. The results are shown in Table 1.

Examples 7 Through 12

A composition for an optical material, and an optical material, according to the present invention were produced by use of 1,3-bis(mercaptomethyl)benzene having an initial turbidity and a turbidity after storage at 50° C. for 7 shown in Table 1 in accordance with the production method shown in Table 1. The results are shown in Table 1.

Comparative Examples 1 Through 4

A composition for an optical material, and an optical material, were produced by use of bis(2-mercaptoethyl)sulfide having an initial turbidity and a turbidity after storage at 50° C. for 7 shown in Table 1 in accordance with the production method shown in Table 1. The results are shown in Table 1.

Comparative Examples 5 Through 8

A composition for an optical material, and an optical material, were produced by use of 1,3-bis(2-mercaptomethyl)benzene having an initial turbidity and a turbidity after storage at 50° C. for 7 shown in Table 1 in accordance with the production method shown in Table 1. The results are shown in Table 1.

The production methods used in the examples and the comparative examples were as follows.

Method A: To a composition containing 5 parts by weight of bis(2-mercaptoethyl)sulfide and 95 parts by weight of bis(β-epithiopropyl)sulfide, 0.1 parts by weight of tetra-n-butylphosphoniumbromide was added as a polymerization catalyst. These compounds were mixed uniformly at room temperature and degassed to prepare a composition for an optical material. The composition for an optical material was injected into a mold, heated for 20 hours from 20° C. to 100° C. to be polymerized and thus cured, and then removed from the mold. Thus, an optical material was obtained.

Method B: To 78 parts by weight of bis(β-epithiopropyl)sulfide and 14 parts by weight of sulfur, 0.5 parts by weight of mercaptomethylimidazole was added. These compounds were preliminarily polymerized and thus cured at 60° C. The consumption ratio of sulfur at this point was 50% by an HPLC analysis (GPC mode). After the resultant substance was cooled down to 20° C., a mixture solution of 7 parts by weight of bis(2-mercaptoethyl)sulfide, 0.2 parts by weight of dibutyltindichloride, and 0.03 parts by weight of tetra-n-butylphosphoniumbromide was added. These compounds were mixed uniformly and degassed to prepare a composition for an optical material. The composition for an optical material was injected into a mold, heated for 20 hours from 20° C. to 100° C. to be polymerized and thus cured, and then removed from the mold. Thus, an optical material was obtained.

Method C: To a composition containing 5 parts by weight of 1,3-bis(mercaptomethyl)benzene and 95 parts by weight of bis(β-epithiopropyl)sulfide, 0.1 parts by weight of tetra-n-butylphosphoniumbromide was added as a polymerization catalyst. These compounds were mixed uniformly at room temperature and degassed to prepare a composition for an optical material. The composition for an optical material was injected into a mold, heated for 20 hours from 20° C. to 100° C. to be polymerized and thus cured, and then removed from the mold, Thus, an optical material was obtained.

Method D: To 78 parts by weight of bis(β-epithiopropyl)sulfide and 14 parts by weight of sulfur, 0.5 parts by weight of mercaptomethylimidazole was added. These compounds were preliminarily polymerized and thus cured at 60° C. The consumption ratio of sulfur at this point was 46% by an HPLC analysis (GPC mode). After the resultant substance was cooled down to 20° C., a mixture solution of 7 parts by weight of 1,3-bis(mercaptomethyl)benzene, 0.2 parts by weight of dibutyltindichloride, and 0.03 parts by weight of tetra-n-butylphosphoniumbromide was added. These compounds were mixed uniformly and degassed to prepare a composition for an optical material. The composition for an optical material was injected into a mold, heated for 20 hours from 20° C. to 100° C. to be polymerized and thus cured, and then removed from the mold. Thus, an optical material was obtained.

Preliminary Experiment

To 100 parts by weight of bis(β-epithiopropyl)sulfide to be used in the examples and the comparative examples, 0.1 parts by weight of tetra-n-butylphosphoniumbromide was added as a polymerization catalyst. These compounds were mixed uniformly at room temperature and degassed. The resultant mixture was injected into a mold, heated for 20 hours from 20° C. to 100° C. to be polymerized and thus cured, and then removed from the mold. Thus, an optical material was obtained. The transparency of the optical material was good and "4". An episulfide compound which was confirmed to maintain a good transparency even after being polymerized and thus cured in this manner was used.

TABLE 1

| Example | Polythiol compound | Initial turbidity value | Post-storage turbidity value | Episulfide compound | Other main component | Polymerization method | Transparency |
|---|---|---|---|---|---|---|---|
| Example 1 | Bis(2-mercaptoethyl)sulfide | 0.15 | 0.15 | Bis(β-epithiopropyl)sulfide | — | A | 4 |
| Example 2 | Bis(2-mercaptoethyl)sulfide | 0.15 | 0.15 | Bis(β-epithiopropyl)sulfide | Sulfur | B | 4 |
| Example 3 | Bis(2-mercaptoethyl)sulfide | 0.26 | 0.28 | Bis(β-epithiopropyl)sulfide | — | A | 3 |
| Example 4 | Bis(2-mercaptoethyl)sulfide | 0.26 | 0.28 | Bis(β-epithiopropyl)sulfide | Sulfur | B | 3 |
| Example 5 | Bis(2-mercaptoethyl)sulfide | 0.32 | 0.43 | Bis(β-epithiopropyl)sulfide | — | A | 2 |
| Example 6 | Bis(2-mercaptoethyl)sulfide | 0.32 | 0.43 | Bis(β-epithiopropyl)sulfide | Sulfur | B | 2 |
| Example 7 | 1,3-bis(2-mercaptomethyl)benzene | 0.15 | 0.17 | Bis(β-epithiopropyl)sulfide | — | C | 4 |
| Example 8 | 1,3-bis(2-mercaptomethyl)benzene | 0.15 | 0.17 | Bis(β-epithiopropyl)sulfide | Sulfur | D | 4 |
| Example 9 | 1,3-bis(2-mercaptomethyl)benzene | 0.26 | 0.33 | Bis(β-epithiopropyl)sulfide | — | C | 3 |
| Example 10 | 1,3-bis(2-mercaptomethyl)benzene | 0.26 | 0.33 | Bis(β-epithiopropyl)sulfide | Sulfur | D | 3 |
| Example 11 | 1,3-bis(2-mercaptomethyl)benzene | 0.45 | 0.58 | Bis(β-epithiopropyl)sulfide | — | C | 2 |
| Example 12 | 1,3-bis(2-mercaptomethyl)benzene | 0.45 | 0.58 | Bis(β-epithiopropyl)sulfide | Sulfur | D | 2 |
| Comparative example 1 | Bis(2-mercaptoethyl)sulfide | 0.18 | 0.63 | Bis(β-epithiopropyl)sulfide | — | A | 1 |
| Comparative example 2 | Bis(2-mercaptoethyl)sulfide | 0.18 | 0.63 | Bis(β-epithiopropyl)sulfide | Sulfur | B | 1 |
| Comparative example 3 | Bis(2-mercaptoethyl)sulfide | 0.51 | 0.51 | Bis(β-epithiopropyl)sulfide | — | A | 1 |
| Comparative example 4 | Bis(2-mercaptoethyl)sulfide | 0.51 | 0.51 | Bis(β-epithiopropyl)sulfide | Sulfur | B | 1 |
| Comparative example 5 | 1,3-bis(2-mercaptomethyl)benzene | 0.19 | 0.65 | Bis(β-epithiopropyl)sulfide | — | C | 1 |
| Comparative example 6 | 1,3-bis(2-mercaptomethyl)benzene | 0.19 | 0.65 | Bis(β-epithiopropyl)sulfide | Sulfur | D | 1 |
| Comparative example 7 | 1,3-bis(2-mercaptomethyl)benzene | 0.55 | 0.57 | Bis(β-epithiopropyl)sulfide | — | C | 1 |
| Comparative example 8 | 1,3-bis(2-mercaptomethyl)benzene | 0.55 | 0.57 | Bis(β-epithiopropyl)sulfide | Sulfur | D | 1 |

In each of the above examples, a composition for an optical material using polythiol fulfilling the conditions that the initial turbidity is 0.5 ppm or less and the turbidity after storage at 50° C. for 7 days is 0.6 ppm or less was polymerized. As a result, post-curing cloudiness was prevented and a high transparency was realized. Thus, according to the present invention, it can be estimated, before the polymerization reaction, whether a composition for an optical material will be clouded or not after being polymerized and thus cured. Thus, it can be determined whether the composition is good or not. Therefore, only an optical material having good properties can be selectably produced. As a result, the composition for an optical material can be effectively utilized and also a superb optical material can be produced.

What is claimed is:

1. A method for obtaining polythiol which is suitable for manufacturing a composition for an optical material which comprises polythiol and episulfide, comprising:

measuring an initial turbidity of the polythiol and a turbidity of the polythiol after being stored at 50° C. for 7 days; and selecting polythiol having an initial turbidity of 0.5 ppm or less and a turbidity of 0.6 ppm or less after being stored at 50° C. for 7 days as target polythiol.

2. The method according to claim 1, further comprising mixing the selected polythiol having an initial turbidity of 0.5 ppm or less and a turbidity of 0.6 ppm or less after being stored at 50° C. for 7 days with episulfide to produce a composition for the optical material.

3. The method according to claim 2, further comprising incorporating sulfur in the composition for the optical material.

4. The method according to claim 2, further comprising degassing the composition for the optical material.

5. The method according to claim 3, further comprising degassing the composition for the optical material.

* * * * *